United States Patent [19]

Rutter

[11] Patent Number: 4,866,855
[45] Date of Patent: Sep. 19, 1989

[54] GAGING HEAD FOR USE ON DIAL BORE GAGES

[75] Inventor: Harold T. Rutter, Kirkwood, Mo.

[73] Assignee: Sunnen Products Company, St. Louis, Mo.

[21] Appl. No.: 153,350

[22] Filed: Feb. 8, 1988

[51] Int. Cl.[4] ............................................. G01C 3/34
[52] U.S. Cl. ...................................... 33/783; 33/827
[58] Field of Search ............ 33/178 R, 147 K, 178 F, 33/178 E, 783, 827, 501.05, 501.08, 501.09, 501.3

[56] References Cited

U.S. PATENT DOCUMENTS

| | | | |
|---|---|---|---|
| 953,282 | 3/1910 | Nash | 33/178 R |
| 1,429,556 | 9/1922 | Bartoldy | 33/178 R |
| 2,329,067 | 9/1943 | Maag | 33/178 R |
| 2,566,160 | 8/1951 | Bowers | 33/178 R X |
| 2,642,672 | 6/1953 | Lewis et al. | 33/178 R |
| 2,842,858 | 7/1958 | Mennesson | 33/178 R |
| 4,227,310 | 10/1980 | Vanderwal | 33/178 D |

FOREIGN PATENT DOCUMENTS

| | | | |
|---|---|---|---|
| 376052 | 5/1923 | Fed. Rep. of Germany | 33/178 R |
| 143826 | 7/1954 | Sweden | 33/178 R |

*Primary Examiner*—Harry N. Haroian
*Attorney, Agent, or Firm*—Haverstock, Garrett & Roberts

[57] ABSTRACT

A gaging head assembly for use on dial bore gages and the like for gaging the diameter and surface characteristics of cylindrical work surfaces including an elongated tubular member having first and second end portions and an opening extending therethrough, an adjustment member positioned for axial movement in the opening, the tubular member being attachable at the first end portion to a dial bore gage and having pairs of opposed work engaging elements adjacent to the second end portion for movement primarily in a radial direction to change the gaging diameter thereof, the adjustment member having a tapered end portion located inwardly of the work engaging elements to simultaneously engage and radially move the pairs of opposed work engaging elements during axial movements thereof, one of the pairs of opposed work gaging elements extending radially outwardly a greater distance than the other pair of opposed elements in all positions of adjustment of the adjustment member. In a preferred embodiment of the present invention, the work engaging elements include work engaging ball-like elements, and in another embodiment the elements are formed as integral parts of the tubular member between axially extending slots which extend into the tubular member from the second end portion thereof.

27 Claims, 2 Drawing Sheets

GAGING HEAD FOR USE ON DIAL BORE GAGES

The present invention relates generally to gaging devices for gaging the diameter and surface characteristics of cylindrical work surfaces to determine if they are of some precise size and surface characteristic and, more particularly, to several embodiments of a gaging head assembly for use on dial bore gages and the like. The present assemblies utilize two pairs of opposed work engaging elements which are simultaneously movable radially under control of an axially movable adjustment member, certain of said elements being less far out radially than others in all positions of adjustment thereof. One pair of opposed work engaging elements function as the gaging members of the device while the other opposed pair of elements function to centralize the gaging elements to assure that the gaging elements are located on a diameter of the work surface to be gaged. The several disclosed embodiments of the present gaging head assembly are interchangeable and can be used on known types of dial bore gages. The construction of the gaging and centralizing means associated with the present devices are such as to enable the present gaging heads to be especially useful to gage relatively small diameter bores.

BACKGROUND OF THE INVENTION

Many different pieces of machinery and other devices include internal surfaces or bores that need to be made to some precise diameter. Such bores are often finished and brought to the desired size or diameter by a honing operation, and in these and other cases, there exists a need to provide very accurate gaging means which are able to quickly and accurately determine if the diameter and surface characteristics are of the desired size and finish or if the diameter is off by some amount, and if so, whether the bore is over or under size. For example, a person drilling, cutting or honing a hole or bore in a particular workpiece will normally perform frequent precise measurements of the bore diameter to ensure that the finished diameter corresponds to that required. Many different types of gaging devices including a wide variety of dial bore gages have been constructed and used in the past to accomplish this end. Dial bore gages are specifically used to determine if the diameter and surface characteristics of cylindrical holes or bores are accurate to some known standard and such gages include gaging head members which engage the surfaces which are to be gaged and have portions operatively connected to dial indicator means which indicate the condition and size of the hole or bore. Typical of the known dial bore gaging devices are those shown and disclosed in U.S. Pat. Nos. 2,968,102; 4,045,877; 4,170,831; 4,227,310; 4,419,829 and 4,419,830.

All known prior art dial bore gages have certain shortcomings, limitations, and disadvantages which have either limited or restricted their usefulness or have greatly affected the accuracy of such devices or have rendered such devices unreliable. For example, many of the known gaging devices are relatively complicated structurally and include complicated work engaging portions. Many of the same devices also include complicated gage centralizing mechanisms for ensuring that the gaging members are located on a diameter of the work surface to be gaged including centralizer mechanisms that are primarily associated with one gaging contact only, usually the movable contact. In addition, the known gaging devices are constructed such that movement of the centralizing members is controlled by a mechanism which is independent from the mechanism controlling movement of the movable gaging member that actually does the gaging. All of these features of the known dial bore gages including especially their work engaging portions have resulted in work engaging portions that are relatively complex, expensive to manufacture, difficult and cumbersome to assemble, disassemble and repair, and the known gage head assemblies have included a relatively large number of parts and/or components all of which have placed severe limitations on them as to the smallness of size and the diameter of bores that can be gaged. As a result, many of the known prior art gaging devices, because of their relatively large size, cannot be made to be inserted into relatively small diameter bores. Furthermore, the known devices have not provided means for prolonging the life of the gage by making the work engaging elements removable, replaceable and interchangeable. Also none of the known gaging heads uses as simple a centralizing means as the present constructions and none utilize a mechanism wherein both the gaging members and the centralizing members are simultaneously movable radially, the gaging members being positioned radially outward slightly further than the centralizing members in all positions of adjustment In addition, the present gaging head constructions are designed to be quickly and easily installed on a gage and placed in operating condition, they are capable of being adjusted to extreme accuracy and close tolerances, and they can be made in a wide variety of sizes including especially in sizes to cover relatively small bore diameters, and all of the different head sizes can be installed for use on the same or similar type gaging devices such as on known dial bore gages.

SUMMARY OF THE INVENTION

The present invention teaches the construction and operation of several embodiments of a detachable gaging head assembly characterized by having a pair of opposed gaging members and a pair of opposed centering or centralizing members simultaneously radially movable by the same axially movable adjustment member. All embodiments of the present gaging head assembly are mountable for use on dial bore gages including dial bore gages of known constructions.

In a preferred embodiment of the present invention, the work engaging elements include two diametrically opposed ball-like gaging members and two diametrically opposed ball-like centralizing members to provide the centralizing action. The gaging and centralizing ball-like members in the subject construction are mounted in respective sockets provided therefor in the gage portion of the assembly in positions to engage respective planar faces formed on a tapered or conical pointed end portion of an adjustment member. An advantage of this embodiment is that the gaging and centralizing members can be easily removed, reversed, replaced and/or interchanged from time to time as required to maintain gage accuracy, to present different faces of the ball-like members to the work surface and to compensate for wear of the work engaging elements. This embodiment of the present gage head construction also includes means to reduce looseness of the ball-like members in their respective sockets, which could result in error.

Another embodiment of the present invention includes a tubular gaging member having a gaging portion formed integral therewith, the gaging portion being formed of four similar segmented portions of the tubular member. The four portions being separated from each other by axial slots extending from one end of the tubular member. In this case, axial movement of an adjustment member having a conically tapered end portion movable in the tubular member radially displaces the opposed pairs of the segmented portions, one opposed pair being radially displaced slightly more than the other pair due to the construction of the segmented portions engaged by the adjustment member. One pair of the opposed segmented portions are the gaging portions and in all positions of adjustment are radially outward slightly further than the other pair which are for centralizing. In this construction, a simple cone-shaped surface on the adjustment member and slightly differently formed surfaces on the respective pairs for gaging and for centralizing is all that is required. This embodiment is simpler structurally than the aforesaid embodiment but has the disadvantage that the work engaging portions are not removable, replaceable or interchangeable.

An important advantage of the present gaging head constructions over prior art constructions is that the present constructions have gaging and centralizing mechanisms which require minimal components of relatively simple construction enabling the present assemblies to be made in small enough sizes to be used to accurately gage relatively small diameter bores as compared to bore diameters that can be gaged with known gaging devices and in particular those that have a centralizing capability.

It is therefore a principal object of the present invention to teach the construction and operation of an improved gaging head construction which has gaging and centralizing capability and is especially useful for accurately gaging relatively small diameter bores.

Another object is to teach the construction and operation of a gaging head assembly having pairs of opposed radially movable elements, one pair being used for gaging and the other for centralizing the gaging elements.

Another object is to simplify the construction of gaging heads having gaging and centralizing means thereon.

Another object is to teach the construction of a gaging head assembly which can be made in sizes that enable it to be used to gage relatively small diameter bores.

Another object is to provide a detachable gaging head assembly which can be installed for use on known dial bore gages.

Another object is to teach the construction and operation of a gaging head assembly wherein the gaging and centralizing means are simultaneously adjustable under control of movements of a single adjustment member.

Another object is to provide a gaging head assembly wherein the gaging and centralizing members can be relatively easily removed, reversed or interchanged to overcome the effects of wear and to maintain gage accuracy by presenting different faces on the work engaging members to the work surface.

Another object is to teach the construction and operation of a gaging head assembly which reduces the chance for error due to looseness of the gaging members.

Another object is to improve the uniformity and size accuracy of cylindrical surfaces such as surfaces that are honed, ground and otherwise machined.

Another object is to teach the construction of a gaging head assembly which can be quickly and easily installed on and/or removed from a gaging device.

Another object is to prolong the useful life of the work engaging elements on a dial bore gage or like device.

Another object is to teach the construction and operation of a gaging head assembly wherein axial movement of an adjustment member simultaneously radially displaces opposed work engaging gaging elements and opposed centralizing elements. dr These and other objects and advantages of the present invention will become apparent to those skilled in the art after considering the following detailed specification in conjunction with the accompanying drawings.

DETAIL DESCRIPTION OF THE INVENTION

Figure 1:
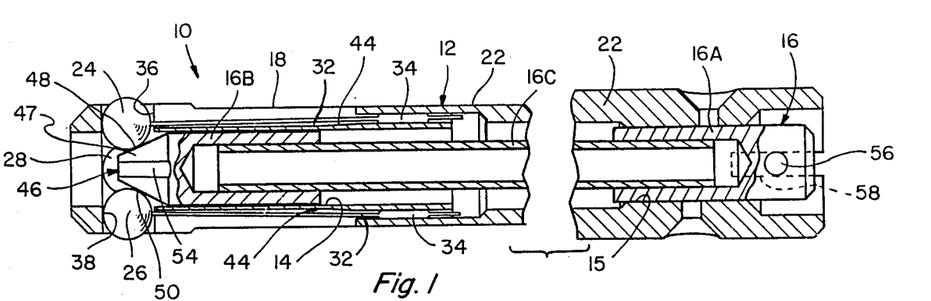
FIG. 1 is an enlarged axial cross-sectional elevational view of one embodiment of a gage head assembly constructed according to the teachings of the present invention.

Referring to the drawings more particularly by reference numbers wherein like numerals refer to like parts, number 10 in FIG. 1 identifies one embodiment of a gaging head assembly constructed according to the teachings of the present invention. The gaging head 10 is constructed to be mountable for use on a dial bore gaging device. Several different embodiments of the present gaging head assembly are disclosed, and all are constructed to be installed for use on such a dial bore gage. The several disclosed gaging head assemblies are preferably interchangeable on the same gage but the means for attaching them are not part of the invention as such. It is sufficient that when they are attached to a gage that the adjustment member make operating contact with the movable pointer in the dial portion of the gage. The present gaging head assemblies can be constructed to have any desired length so that they can be positioned to extend to a desired depth into a bore to be gaged.

The gaging head 10 includes an elongated substantially tubular member 12 having a passageway or bore shown formed by communicating bore portions 14 and 15 which together extend therethrough from end to end. The bores 14 and 15 slidably receive a plunger adjustment assembly 16 positioned for axial movement therewithin. The plunger assembly 16 is constructed of spaced portions 16A, 16B connected by connecting tube 16C (FIG. 1). The portions 16A and 16B are sized to be slidable in the respective bore portions 15 and 14. The tubular member 12 is also shown constructed of separate connected tubular sections 18 and 22 of different diameters.

Figure 2:
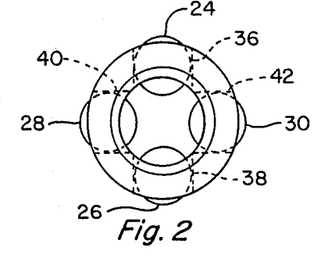
FIG. 2 is an enlarged left end view of the gage head assembly of FIG. 1.
Figure 3:
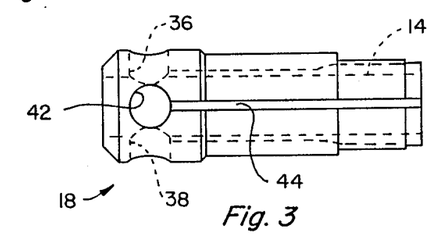
FIG. 3 is a partial side elevational view of the work engaging end portion of the assembly shown in FIG. 1 with the ball-like members removed therefrom.

The tubular portion 18 as shown in FIGS. 1 and 3 is the portion of the assembly 10 that extends into the work surface to be gaged and includes means for mounting two diametrically opposed gaging elements 24 and 26 and two diametrically opposed centering or centralizing elements 28 and 30 as shown in FIGS. 1 and 2. The gaging elements 24 and 26 are the elements that engage opposite sides of a cylindrical work surface to be gaged. To be sure that the gaging elements 24 and 26 are located on a diameter of the work surface to be gaged, the two oppose centering elements 28 and 30 are located circumferentially midway between the elements 24 and 26 and they also are able to move radially with the elements 24 and 26 but do not extend radially outwardly as far as the elements 24 and 26. This is so that they will centralize the gaging elements 24 and 26 to assure that they are on a diameter of the bore during gaging. This is done to assure accurate gage readings. The gaging elements 24 and 26 and the centering elements 28 and 30 all move radially inwardly and outwardly together when the adjustment assembly 16 moves axially as will be explained. However, and importantly, the gaging elements 24 and 26 in all positions of the adjustment assembly 16 are radially outwardly slightly further than the centralizing elements 28 and 30 and it is this feature that assures close centralizing of the gaging elements in all gaging positions. The way this is done enables the present construction to be relatively simple in construction and compact so that the subject heads can be used on known gaging devices to provide extreme accuracy and to extend the range of bore diameters that can be gaged to much smaller bore diameters than have been gaged in the past using gages that also provide centralizing.

Figures 4, 4A:
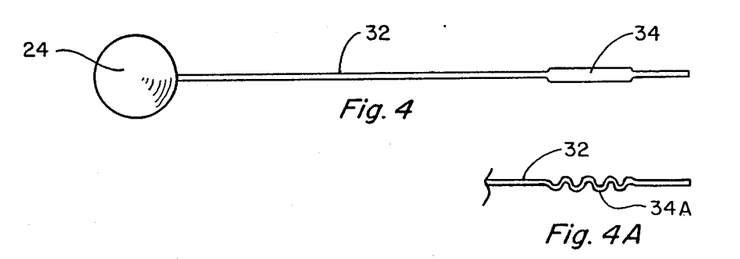
FIG. 4 is an enlarged side elevational view of one of the ball-like members used in the assembly shown in FIG. 1.
FIG. 4A is a fragmentary top plan view showing a modified form of a portion of the ball-like member shown in FIG. 4.

The gaging elements 24 and 26 and the centering elements 28 and 30 are shown as being round ball-like members (FIG. 4), at least the gaging elements 24 and 26 being formed of a relatively hard wear resistant material such as steel, tungsten carbide, ceramic or other like material. Each ball-like member 24-30 has connected thereto an elongated flexible shaft portion 32 extending radially outwardly from the center thereof. Each of the shaft portions 32 also has a flattened or wavy portion 34 (or 34A) as shown in FIGS. 4 and 4A usually located adjacent the free end thereof, the transverse dimension of which portion is slightly greater than the diameter of the shaft 32. Each of the flattened or wavy portions 34 or 34A serves to orient the ball member 24 (or 26, 28 and 30) in any one of four different positions or orientations when installed on the gaging portion 18 of the assembly 10 as will be explained. The shaft portions 32 and the portions 34 (or 34A) are preferably made of a relatively hard flexible material such as piano wire. Each of the balls 24-30 are similarly mounted on the portion 18 of the member 12 as shown in FIG. 1.

The gaging and centralizing balls 24-30 are mounted in respective sockets or openings 36-42 provided therefor in the gaging portion 18 as best shown in FIGS. 1-3. The openings or sockets 36-42 communicate with respective relatively narrow axial grooves or slots 44 extending therefrom along most of the length of the gaging portion 18. These axial grooves 44 are outwardly of and do not communicate directly with the central passageway 14 for the adjustment member 16. The grooves 44 are dimensioned circumferentially so as to be slightly narrower in width than the transverse dimension of the flattened or wavy portions 34 or 34A of the shafts 32 so that the shafts 32 can be positioned extending into the grooves 44 in four different positions spaced approximately 90° apart. This means that each of the gaging and centering ball-like members 24-30 can be installed in the respective sockets 36-42 in one of four different orientations. Also, and importantly, when assembled, an outer portion of the section 22 of the tubular member 12 extends over the end portion of the respective grooves 44 and over the shaft portions 32 positioned therein to hold the balls engaged in their respective sockets 36-42. This holds and secures the elongated shaft portions 32 within the respective grooves 44 and prevents the ball-like members from falling out or coming loose in the gaging head portion 18. Also, as stated, since each shaft portion 32 is resilient, it will bias its respective ball-like member 24-30 inwardly in its respective socket but will also permit it to move outwardly under tension. When properly positioned within the respective sockets 36-42, a portion of each respective ball-like member 24-30 extends into the passageway 14 in the gaging portion 18 and another portion extends radially outwardly therefrom to a position beyond the outer periphery thereof for its gaging or centralizing operation.

Figure 6:
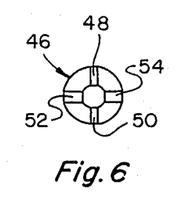
FIG. 6 is a left end view of the tapered end portion of the adjustment member of FIG. 5.

The adjustment member 16 is positioned in the passageway 14 and includes a tapered forward end portion 46 which has a frusto-conical end surface 47 which is modified by having separate flat planar surface portions 48-54 (FIGS. 1 and 6) formed thereon at positions to make contact with the respective gaging and centralizing members 24-30. The surfaces 48-54 are planar surfaces formed as by machining them into the frusto-conical end surface 47 at appropriate locations. This is done so that the ball members will make contact with flat instead of with rounded or conical surface portions on the adjustment member 16 to provide better and more accurate support therefor in all positions. The surfaces 48 and 50 and the surfaces 52 and 54 are arranged in diametrically opposed relationship as shown in FIG. 6. Once the adjustment member 16 is moved to a position in the passageway 14 so that the planar surfaces 48-54 of the adjustment member 16 are in engagement with the respective ball-like members 24-30, any further axial movement of the adjustment member 16 in a forward direction will displace the respective ball-like members radially outwardly as best shown in FIG. 1.

The surfaces of one pair of the diametrically opposed planar surfaces, namely, the surfaces 52 and 54, are machined to be slightly deeper into the frusto-conical end surface 47 than the surfaces 48 and 50 and therefore they are also somewhat wider. Since the surfaces 48 and 50 are less deep, they will engage and move the respective ball-like members 24 and 2 outwardly a distance slightly greater in all positions of the adjustment member 16 than the ball-like members 28 and 30. The ball-like members 24 and 26 which are pushed radially outwardly the furthest will therefore engage the work surface to be gaged, and these ball members are the gaging elements which provide a dial reading when being used to gage a work surface. By the same token, the deeper surfaces 52 and 54 will engage and move the centralizing ball-like members 28 and 30 radially outwardly but somewhat less far than the balls 24 and 26, and this means that the members 28 and 30 may not actually engage the work surface during a gaging operation, or if they do, will operate to maintain the gaging balls 24 and 26 on a diameter of the work surface. This is because the balls 28 and 30 will move sufficiently close to such work surface to assure that the gaging members 24 and 26 are at all times located on a diameter of such work surface. Thus the members 28 and 30 operate as centering or centralizing means to locate the gaging balls on a diameter. Axial movement of the adjustment member 16 maintains this relationship in all positions thereof by displacing the gaging balls 24 and 26 radially at the same rate as the centralizing ball 28 and 30 to change the gaging diameter and to maintain the balls 28 and 30 close to the work surface for centering purposes in all positions thereof.

It is recognized, however, that the sockets or openings 40 and 42 for mounting the centralizing members 28 and 30 on the member 18 may be moved axially slightly forward or toward the end of such member in relation to the sockets 36 and 38 for mounting the gaging balls 24 and 26, in which case the four flats 48–54 on the member 16 can all be machined to the same depth. If this is done, the gaging balls will project radially outwardly slightly further than the centralizing balls in all positions of the adjustment member 16. This represents an alternative and less expensive way for maintaining this important relationship between the gaging and centralizing elements in all positions of adjustment of the member 16.

Figure 5:
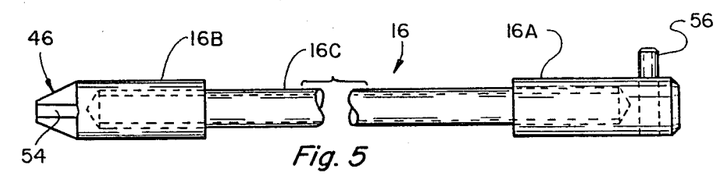
FIG. 5 is an enlarged side elevational view of the plunger-like adjustment member employed in the assembly shown in FIG. 1.

To ensure that the adjustment member 16 is properly inserted and oriented circumferentially in the tubular member 12 such that the planar surfaces 48–54 are properly oriented for engagement with the respective ball-like members 24–30, a sidewardly extending alignment pin 56 is attached to the portion 16A of the adjustment member 16 near the terminal or rear end thereof as shown in FIG. 5. The alignment pin 56 is engageable with either slot of a pair of axially extending opposed slots 58 (FIG. 1) formed in the tubular portion 22 of the member 12. The opposed slots 58 are so located that when the pin 56 is engaged therewith, the ball-like members 24–30 will line up with the appropriate planar surfaces 48–54 on the adjustment member 16. This also means that the adjustment member 16 can only be inserted into the tubular member 12 in one of two different 180° apart orientations, and this prevents any misalignment between the ball-like members 24–30 and the planar surfaces 48–54.

Use of ball-like members to gage and centralize and use of the specially constructed adjustment member 16 are important features of this embodiment of the present construction. This in part is because these features enable centering and gaging adjustments to be accomplished simultaneously through axial movements of the single adjustment member 16. The present gaging head 10 is also very simple structurally and operationally as compared to known gaging devices that provide both gaging and centralizing functions. The present simple construction also enables the head to be made in small sizes for gaging small diameter bore surfaces.

Another important feature of the embodiment 10 is that the gaging and centralizing members 24–30 are easily removable and can be interchanged and/or reversed and/or replaced to maintain gage accuracy and to present different gaging faces to the work surface. This also makes it possible to use relatively hard ball-like members for the gaging members and to relocate or reverse such members from time to time a wear occurs. It is anticipated that moderate to heavy usage of the gage head 10 will result in some wear particularly of the gaging members 24 and 26 due to repeated rubbing thereof on work surfaces being gaged and this can largely be compensated by reversing the orientation of the gaging members since different portions of the gaging members or balls will engage the planar surfaces 48–54 and the work surface in the different positions thereof. Since the gaging members 24 and 26 are spherical in shape, they can be easily removed from their mountings and reinstalled in four different positions in the same or in different positions on the gaging head. This is accomplished by pushing up on the ball-like members 24 and 26 to raise them out of their respective sockets 36 and 38 using a simple pin that is smaller than the ball diameter. To do this, the pin is inserted in from the free end of the opening 14 and pressed against the inner surface of the member 24 (or 26 or 28 or 30) which extends therein. This pushing action will move the members sufficiently in their respective sockets 36 and 38 so that they can be grasped and removed by pulling on them and their associated shafts 32 to remove the shafts from the slots 44. Once removed, the flattened or wavy shaft portion 34 or 34A of each gaging member 24 and 26 may be repositioned in its own or in another groove 44 to change the position of the balls or to place them in another position or replace them. If repositioned in its own groove, a different surface of the ball-like gaging member will be exposed for gaging or centralizing. Since the centralizing members 28 and 30 normally do not engage and rub on the work surface to the same extent as the gaging members 24 and 26, little or no wear will normally occur to them, and therefore these members can be used to replace the gaging members as wear occurs if they are made of a similar material. The ability to relatively easily remove and replace the gaging and centralizing members from their respective mountings and the ability to reinstall such members in different positions is an important feature of the present embodiment.

As indicated, it is advantageous especially to have the gaging members 24 and 26 make contact with relatively flat planar surfaces on the adjustment member 16, such as the surfaces 48 and 50 rather than with a rounded or conical surface such as the conical surface 47 or with a point contact as is commonly done in known gaging heads. The flat surfaces 48–54 provide better support for the ball members, they produce less wear on the adjustment member and on the ball members, and they reduce error due to looseness of the parts including looseness of the ball-like members in their respective sockets. Also the use of flat planar surfaces on the tapered end portion of the adjustment member improves the gaging accuracy since it eliminates the possibility that even slight off-centering of the gaging members due to looseness or otherwise can occur and produce error such as might occur if a conical surface is used to engage and support the gaging members. Such contact would produce essentially point-to-point contact which can be easily damaged if excessive pressure is applied or can occur if the head were dropped.

Figure 7:
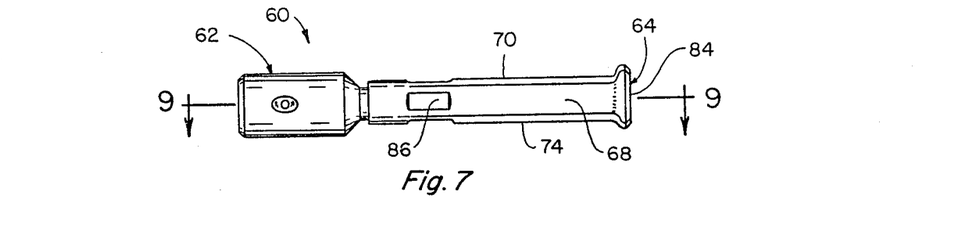
FIG. 7 is an enlarged side elevational view showing another embodiment of a gage head assembly constructed according to the present invention.
Figure 8:
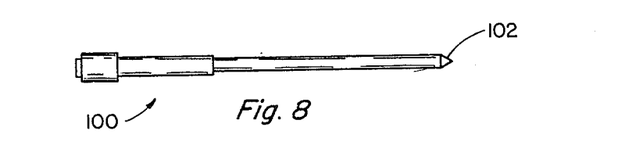
FIG. 8 is a side elevational view of the adjustment member employed in the gaging head assembly of FIG. 7.
Figure 9:
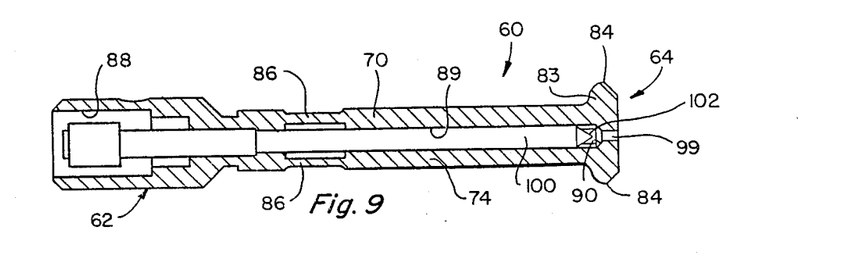
FIG. 9 is a further enlarged cross-sectional view taken along line 9—9 of FIG. 7 showing the adjustment member of FIG. 8 positioned in the assembly.
Figures 10, 11, 12:
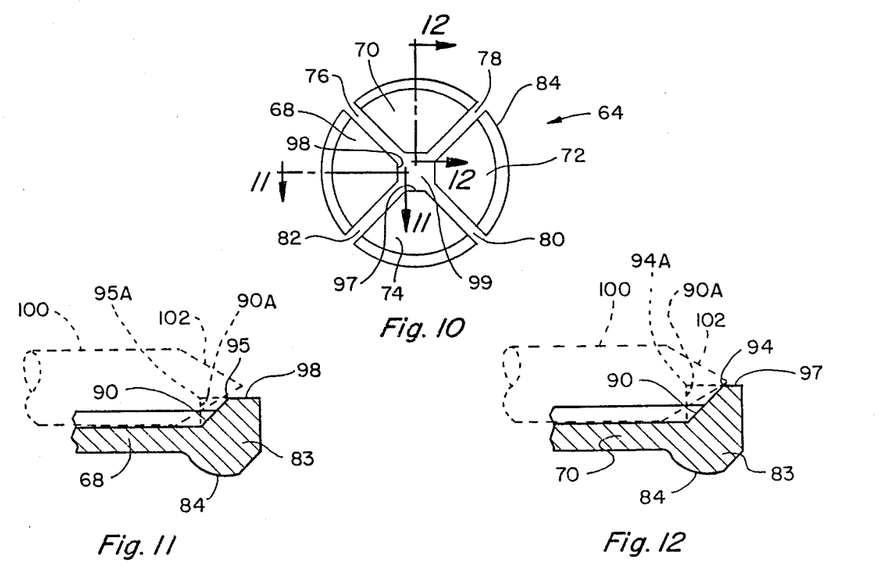
FIG. 10 is a right end view of the gaging head assembly of FIGS. 7 and 9.
FIG. 11 is an enlarged fragmentary cross-sectional view taken along line 11—11 of FIG. 10 with the adjustment member shown in dotted outline.
FIG. 12 is an enlarged fragmentary cross-sectional view taken along line 12—12 of FIG. 10.
Figure 13:
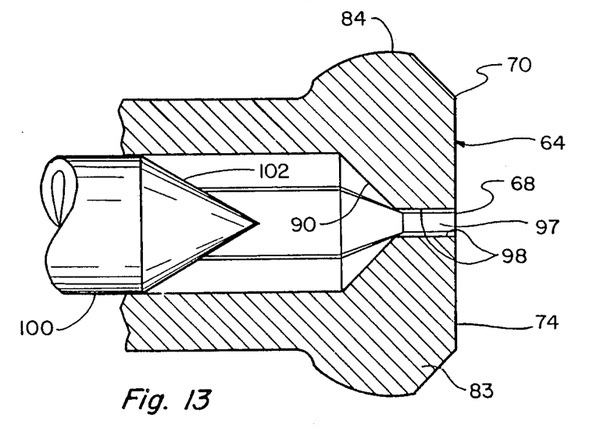
FIG. 13 is a still further enlarged cross-sectional view of the gaging end portion of the assembly shown in FIG. 9.

FIGS. 7-12 disclose another embodiment 60 of a gaging head assembly constructed according to the present invention. The gaging head 60 is likewise mountable for use on a dial bore gage including a known dial bore gage and includes a tubular member 62 having a gaging end portion 64 formed integral therewith. The gaging portion 64 as best shown in FIG. 10 includes four spaced segmented quadrature portions 68, 70, 72 and 74, the adjacent quadrature portions being separated from each other by spaces formed by slots 76, 78, 80 and 82. The slots extend axially into the gaging end portion 64 of the member 62 as best shown in FIGS. 7 and 10. The quadrature portions 68-74 may be similarly or differently shaped and each includes a curved or rounded radially outwardly extending work engaging portion 83 (FIGS. 9, 11, 12 and 19) with a work engaging surface 84 formed thereon. The portions 83 are preferably positioned closely adjacent to the terminal or gaging end of the member 62, and the surfaces 84 on the two opposite portions 70 and 74 are the gaging surfaces and the other two surfaces 84 are for centralizing. The axially extending grooves or slots 76-82 divide the gaging portion 64 into the respective spaced quadrature portions 68-74, and the length, shape and construction of the portions 68-74 enable them to be deflected radially outwardly when being adjusted. The portions 68-74 are also resilient so that they deflect outwardly under stress, and when relieved will return radially inwardly to their unstressed conditions. Movement of the quadrature portions 68-74 is under control of an adjustment member 100 (FIG. 8) which is axially movable in bores 88 and 89 in the member 62 as will be hereinafter more fully explained.

The bores 88 and 89 extend most of the way through the member 62 from the rear end thereof to a point adjacent to the gaging end 64. At this point, the bore portion 89 is partially closed by a segmented conical or flat shaped surface 90 (or 90A) inwardly of the work engaging portions 83 as shown in FIGS. 11 and 12. The segmented surface 90 or 90A is formed on the four portions 68-74 as parts of a conical or flat surface extending between the slots 76-82. Portions of the surface 90 terminate at edges 94 and 95 (FIGS. 11 and 12) which edges are on cords of different concentric circles. The arcuate edges 94 and 95 are made to be at different locations by machining different depth flat surfaces 97 and 98 on the inner surfaces of the segmented portions 68-74. Portions of the surface 90A terminate at edges 94A and 95A and are straight edges rather than rounded edges but serve the same purpose as the edges 94 and 95. All four of the flats 97 and 98 together define a substantially rectangular shaped space or cross bore 99 between the segments 68-74.

The plunger shaped adjustment member 100, shown in FIGS. 8 and 9, is positioned for axial movement in the bore 89 and includes a conically tapered end portion 102! The taper of the portion 102 is less steep than the taper of the segmented conical or flat surfaces 90 and 90A so that the portion 102 will engage only the edges 94 (or 94A) and 95 (or 95A) of the segments 68-74 when it is moved axially during adjustment. However, the edges 94 (or 94A) on the two opposed gaging segments 70 and 74 extend radially inwardly slightly further than the edges 95 (or 95A) on the opposed segments 68 and 72 (FIGS. 10-12) and this slight difference is important to the operation of the gaging head 60. What this means is that as the adjustment member 100 moves axially in the bore 89, the cone-shaped end portion 102 will engage the edges 94 or 94A (FIG. 12) slightly before it engages the edges 95 or 95A (FIG. 11). Thereafter, as the member 100 continues to move axially in the member 62, it will push the portions 70 and 74 radially outwardly slightly further in all positions thereof than it will push the portions 68 and 72. This means that the portions 70 and 74, by being radially out further, will perform the gaging operation while the portions 68 and 72 will perform the centralizing operation.

FIGS. 11 and 12 illustrate the positions of the segmented portions 68 (or 72) and 70 (or 74) for one position of the tapered end portion 102 of the adjustment member 100. The position shown is the position in which the end portion 102 is just engaging the edges 94 on the segments 70 (and 74) while it is still slightly spaced from the edges 95. In this position, no radial movement of any of the segments 68-74 has occurred. As the adjustment member 100 is moved to the right, the portions 70 and 74 will move radially outwardly as will the portions 68 and 72 but only after being engaged by the portion 102. Thus, in a manner similar to the adjustment member 16 associated with the assembly 10, axial movements of the adjustment member 100 displaces the quadrature gaging portions 70 and 74 radially to change the gaging diameter of the instrument while, at the same time, the same movements similarly displace the quadrature centralizing portions 68 and 72 to assure that the gaging portions are at all times properly located on a diameter of the work surface to be gaged.

Besides achieving all of the aforementioned objects and goals discussed with respect to the gaging head assembly 10, the gaging head construction 60 has the advantage of being relatively easy and inexpensive to manufacture using relatively simple machining techniques. For example, the members 62 and 100 both lend themselves to being constructed of stock that is machined to proper shape and size as required! The construction 60 is also simple structurally in that it includes only two members one of which includes the four quadrature portions 68-74 with the only difference between them being in the depth of the machining of the surfaces 97 and 98.

In addition, the outer annular work engaging curved surfaces 84 on each quadrature portion 68-74 are the same and can be accurately formed so that the diameter of the work surface can be determined by them. It is expected that adjustment of the head in the manner indicated will result in the gaging portion 64 being slightly non-round so that only the two most outwardly extending gage surfaces 84 associated with the portions 70 and 74 will do the gaging. This is desirable, and provides means that can be accurately pre-adjusted to precise dimensions using suitable means such as a setting fixture or the like. A suitable setting fixture for this purpose may be a fixture such as shown and described in Vanderwal, Jr. U.S. Pat. No. 4,227,310. Once a desired setting in established, a dial bore gage with the subject gaging head assembly 60 attached thereto can be used and operated in substantially the same manner as gaging heads of more conventional construction. Note also that the edges 94 and 95 are arcuate in shape and engage the conical surfaces 102 on the adjustment member 100 while the edges 94A and 95A are straight and engage the same conical surface 102. This makes for line contact or nearly line contact between the adjustment member and the segments 68–74 which contact is self-centering in the case of arcuate edges 94 and 95 to provide more and better support than would be possible with point contact.

Thus, there has been shown and described several embodiments of a novel gaging head construction for use on dial bore gages and like devices, which constructions fulfill all of the objects and advantages sought therefor! Many changes, modifications, variations and other uses and applications of the present devices will, however, become apparent to those skilled in the art after considering this specification and the accompanying drawings. All such changes, modifications, variations and other uses and applications which do not depart from the spirit and scope of the invention are deemed to be covered by the invention which is limited only by the claims which follow.

What is claimed is:

1. A gaging head assembly for use on a gaging device for gaging the size and surface characteristics of a cylindrical work surface comprising an elongated tubular member having first and second end portions, means adjacent said first tubular end portion for attaching said member to a gaging device, a plurality of spaced work engaging elements located adjacent said second tubular end portion including a first pair of opposed elements including means for engagement with the opposite sides of a work surface to be gaged, a second pair of opposed elements circumferentially angularly oriented relative to the first pair including centralizing surface portions for centralizing the first pair of work engaging elements on a diameter of the work surface to be gaged, and an elongated adjustment member positioned for axial movement in the tubular member, said adjustment member and said pairs of opposed work engaging elements having cooperatively slidably engageable surface portions to change the radial distance between the first and second opposed pairs of work engaging elements, said cooperatively engageable surface portions including means on the adjustment member engageable with the surface portions on the first and second opposed pairs of work engaging elements in positions to maintain the first opposed pair of work engaging elements at a different radial location on the gaging head assembly than the second opposed pair of work engaging elements, the spacing between the work engagement means on the first opposed pair of elements being maintained diametrically further apart in all operative positions of the adjustment member than the centralizing surface portions on the second opposed pair of elements.

2. The gaging head assembly of claim 1 including means normally biasing said first and second pairs of opposed work engaging elements radially inwardly.

3. The gaging head assembly of claim 1 wherein the work engaging elements of at least one of said opposed first and second pairs include ball portions and means adjacent to the second tubular end portion for mounting the ball portions thereon.

4. The gaging head assembly of claim 3 wherein the means adjacent the second tubular end portions include means that enable each of the work engaging ball portions to be mounted in at least two alternative positions on the tubular member.

5. The gaging head assembly of claim 3 wherein said means on the elongated adjustment member includes a conical surface having opposed pairs of flats formed on opposite sides thereof at positions to engage respective ones of the ball portions.

6. The gaging head assembly of claim 5 wherein one pair of opposed flats are machined into the conical surface deeper than the other pair.

7. The gaging head assembly of claim 5 including means to circumferentially orient the adjustment member in the tubular member so that the ball portions engage respective flats of said pairs of opposed flats.

8. The gaging head assembly of claim 1 wherein work engaging elements are integral with the tubular member and are formed by and between circumferentially spaced slots extending axially into the tubular member form the second end portion thereof.

9. The engaging head assembly of claim 1 wherein said means on the adjustment member includes an end facing conical surface, each of said work engaging elements having an inwardly facing edge engageable with the conical surface during adjustment thereof.

10. The gaging head assembly of claim 9 wherein one of said pairs of opposed work engaging elements have inwardly facing edges for engaging the conical surface on the adjustment member that extend radially inwardly further than the inwardly facing edges on the other pair of opposed work engaging elements.

11. The gaging head assembly of claim 3 wherein the means for mounting one of said opposed pairs of ball portions are axially displaced relative to the means for mounting the other of said opposed pairs of ball portions.

12. A gage head assembly for use on a gaging device such as a dial bore gage used for gaging cylindrical surfaces and surface characteristics comprising an elongated substantially tubular member having opposed ends and a passageway therethrough, pairs of opposed ball-like work engaging elements and mounting means adjacent one end for attaching said tubular member to a gaging device, means adjacent to the opposite end for mounting said pairs of opposed ball-like elements in positions for movement radially to establish a desired gaging condition, an elongated adjustment member positioned for axial movement in the tubular member having an axially tapered end portion positioned to engage the ball-like elements during axial movement thereof to move the ball-like elements radially on the tubular member, the axially tapered end portion of said adjustment member including pairs of opposed planar faces, one pair of opposed faces engaging the ball-like elements of one opposed pair and the other pair of opposed faces engaging the ball-like elements of the other opposed pair, the planar faces of one opposed pair being offset slightly axially relative to the other pair of planar faces.

13. The gage head assembly of claim 12 wherein said means on the tubular member for mounting the work engaging elements includes pairs of opposed sockets formed in the tubular member, each of said sockets communicating with the passageway through the tubular member, and a groove extending axially from each socket in the tubular member, each of said work engaging elements including a ball portion and a connected rod portion extending outwardly therefrom, one of said rod portions extending into each of said axially extending grooves in position to maintain the associated ball portion in the respective socket.

14. The gage head assembly of claim 13 wherein the rod portions of the work engaging elements and the grooves in which they are positioned are cooperatively engageable in at least two alternative positions.

15. A gaging head for use on a dial bore gage or like device comprising an elongated tubular member having first and second opposite end portions, means adjacent said first end portion for attaching to a gaging device such as a dial bore gage, first and second pairs of opposed work engaging elements adjacent to the second end portion of the tubular member, said pairs of work engaging elements being circumferentially angularly oriented relative to each other, and an elongated adjustment member positioned for axial movement in said tubular member, said adjustment member having an axially tapered end portion positioned in the tubular member radially inwardly of the pairs of work engaging elements for engagement therewith whereby axial movements of the adjustment member produce radial movements of the work engaging elements, said first pair of opposed work engaging elements and said tapered end portion of the adjustment member having cooperatively engageable means which establish a predetermined set of spacings between said elements of said first set of elements in various positions of the adjustment member in the tubular member and said second pair of opposed work engaging elements and the tapered end portion of the adjustment member establishing a set of spacings between the work engaging elements of said second pair that is different from the spacing between the work engaging elements of the first pair for each position of adjustment of the adjustment member in the tubular member.

16. The gaging head of claim 15 wherein the first and second pairs of opposed work engaging elements include spaced radially extending sockets formed in the second end portion of the tubular member and a ball member positioned for radial movement in each of said sockets.

17. The gaging head of claim 16 wherein the tapered end portion of the adjustment member includes a conical surface having pairs of opposed flats formed on opposite sides thereof at positions to engage respective ones of the ball members.

18. The gaging head of claim 17 wherein the flats of one pair of opposed flats are machined to be deeper into the conical surface than the flats of the other pair.

19. The gaging head of claim 17 including cooperatively engageable means on the adjustment member and on the tubular member to maintain predetermined circumferential orientation therebetween.

20. The gaging head of claim 15 wherein the tapered end portion of the adjustment member is conical over at least a portion thereof.

21. The gaging head of claim 20 wherein the first and second pairs of opposed work engaging elements have inwardly extending portions which slidably engage the tapered end portion of the adjustment member during axial movements thereof, the inwardly extending portion on the first pair extending radially inwardly further than the inwardly extending portions on the second pair.

22. A gaging head assembly for use on a gaging device for gaging the size and surface characteristics of a cylindrical work surface comprising a tubular member having first and second end portions and an opening extending substantially the entire length therethrough, means adjacent said first tubular end portion for attaching said member to a gaging device, groove means extending axially into the tubular member form said second end portion dividing said second tubular end portion into two pairs of opposed segments each capable of limited radial deflection, each of said space d segments having a radially inwardly extending edge formed thereon adjacent the second end portion of the tubular member, the edges and one pair of opposed segments extending inwardly further than the edges on the other pair of opposed segments, an adjustment member positioned for axial movement in the opening of said tubular member, said adjustment member having a conical shaped end portion positioned to cooperatively engage the inwardly extending edges on the pairs of opposed segments, axial movements of said adjustment member radially displacing the pairs of opposed segments.

23. The gaging head assembly of claim 22 wherein each segment of said opposed pairs of segments has an arcuate shaped radially outwardly facing work engaging surface formed thereon.

24. A gaging head assembly for use on a gaging device for gaging the size ad surface characteristics of a cylindrical work surface comprising an elongated tubular member having first and second end portions, means adjacent said first tubular end portion for attaching said member to a gaging device, a plurality of spaced work engaging elements located adjacent said second tubular end portion including first pair of opposed elements including means for engagement with the opposite sides of a work surface to be gaged, a second pair of opposed elements circumferentially angularly oriented relative to the first pair for centralizing the first pair of work engaging elements on a diameter of the work surface to be gaged, and an elongated adjustment member positioned for axial movement in the tubular member, said adjustment member having beveled means on one end thereof for slidable engagement with means on the pairs of opposed work engaging elements to change the radial distance between the first and second opposed pairs of elements, said beveled means and the means engageable therewith on the pairs of opposed elements being constructed to maintain the spacing between the work engagement means on the first opposed pair of elements radially further apart than the second opposed pair of elements, the beveled one end portion of said adjustment member including an end facing conical surface, each of said work engaging elements having an inwardly facing edge engageable with said conical surface during adjustment thereof, one of said pairs of opposed work engaging elements having inwardly facing edges for engaging the conical surface on said adjustment member that extend radially inwardly further than the inwardly facing edges on the other pair of opposed work engaging elements.

25. A gaging head assembly for use on a gaging device for gaging the size and surface characteristics of a cylindrical work surface comprising an elongated tubular member having first and second end portions, means adjacent said first tubular end portion for attaching said member to a gaging device, a plurality of spaced work engaging elements located adjacent said second tubular end portion including a first pair of opposed elements including means for engagement with the opposite sides of a work surface to be gaged, a second pair of opposed elements circumferentially angularly oriented relative to the first pair for centralizing the first pair of work engaging elements on a diameter of the work surface to be gaged, and an elongated adjustment member positioned fore axial movement in the tubular member, said adjustment member having beveled means on one end thereof for slidable engagement with means on the pars of opposed work engaging elements to change the radial distance between the first and second opposed pairs of elements, said beveled means and the means engageable therewith on the pairs of opposed elements being constructed to maintain the spacing between the work engagement means on the first opposed pair of elements radially further apart than the second opposed pair of elements, the work engaging elements of at least one of said opposed first and second pairs including ball portions and means adjacent to the second tubular end portion for mounting the ball portions thereon, the beveled means on the one end of said adjustment member including a conical surface having opposed pairs of flats formed on opposite sides thereof at positions to engage respective ones of said work engaging elements, one pair of opposed flats being machined into the conical surface deeper than said other pair.

26. A gaging head assembly for use on a gaging device for gaging the size and surface characteristics of a cylindrical work surface comprising an elongated tubular member having first and second end portions, means adjacent said first tubular end portion for attaching said member to a gaging device, a plurality of spaced work engaging elements located adjacent said second tubular end portion including a first pair of opposed elements including means for engagement with the opposite sides of a work surface to be gaged, a second pair of opposed elements circumferentially angularly oriented relative to the first pair for centralizing the first pair of work engaging elements on a diameter of the work surface to be gaged, and an elongated adjustment member positioned for axial movement in the tubular member, said adjustment member having beveled means on one end thereof for slidable engagement with means on the pairs of opposed work engaging elements to change the radial distance between the first and second opposed pairs of elements, said beveled means and the means engageable therewith on the pairs of opposed elements being constructed to maintain the spacing between the work engagement means on the first opposed pair of elements radially further apart than the second opposed pair of elements, the work engaging elements of at least one of said opposed first and second pairs including ball portions and means adjacent to the second tubular end portion for mounting the ball portions thereon, the beveled means on the one end of said adjustment member including a conical surface having opposed pairs of flats formed on opposite sides thereof at positions to engage respective ones of said work engaging elements, said assembly including means to circumferentially orient the adjustment member in the tubular member so that the work engaging elements engage the respective flats of said pairs of opposed flats.

27. A gaging head assembly for use on a gaging device for gaging the size and surface characteristics of a cylindrical work surface comprising an elongated tubular member having first and second end portions, means adjacent said first tubular end portion for attaching said member to a gaging device, a plurality of spaced work engaging elements located adjacent said second tubular end portion including a first pair of opposed elements including means for engagement with the opposite sides of a work surface to be gaged, a second pair of opposed elements circumferentially angularly oriented relative to the first pair for centralizing the first pair of work engaging elements on a diameter of the work surface to be gaged, and an elongated adjustment member positioned for axial movement in the tubular member, said adjustment member having beveled means on one end thereof for slidable engagement with means on the pairs of opposed work engaging elements to change the radial distance between the first and second opposed pairs of elements, said beveled means and the means engageable therewith on the pairs of opposed elements being constructed to maintain the spacing between the work engagement means on the first opposed pair of elements radially further apart than the second opposed pair of elements, the work engaging elements of at least one of said opposed first and second pairs including ball portions and means adjacent to the second tubular end portion for mounting the ball portions thereon, said means for mounting one end of said opposed pairs of ball portions being axially displaced relative to the means for mounting the other of said opposed pairs of ball portions.

* * * * *

UNITED STATES PATENT AND TRADEMARK OFFICE
CERTIFICATE OF CORRECTION

PATENT NO. : 4,866,855
DATED : September 19, 1989
INVENTOR(S) : Harold T. Rutter It is certified that error appears in the above-identified patent and that said Letters Patent is hereby corrected as shown below:

Column 2, line 27, after "adjustment", insert --.-- .

Column 4, line 11, after the period, delete --dr-- .

Column 5, line 33, "oppose" should be --opposed-- .

Column 7, line 7, "2" should be --26-- .

Column 9, line 68, "102!" should be --102.-- .

Column 10, line 48, "required!" should be --required.-- .

Column 11, line 17, "therefor!" should be --therefor.-- .

Column 12, line 22, "form" should be --from-- .

Column 14, line 8, "form" should be --from-- .

Column 14, line 11, "space d" should be --spaced-- .

Column 14, line 29, "ad" should be --and--.

UNITED STATES PATENT AND TRADEMARK OFFICE
CERTIFICATE OF CORRECTION

PATENT NO. : 4,866,855

DATED : September 19, 1989

INVENTOR(S) : Harold T. Rutter

It is certified that error appears in the above—identified patent and that said Letters Patent is hereby corrected as shown below:

```
Column 14, line 35, after "including", insert --a-- .

Column 15, line 8, "fore" should be --for-- .

Column 15, line 10, "pars" should be --pairs-- .
```

Signed and Sealed this

Twenty-first Day of August, 1990

Attest:

HARRY F. MANBECK, JR.

*Attesting Officer*  *Commissioner of Patents and Trademarks*